(12) United States Patent
Hellman et al.

(10) Patent No.: US 8,355,935 B2
(45) Date of Patent: Jan. 15, 2013

(54) THIRD PARTY INFORMATION TRANSFER

(75) Inventors: Brett Alexander Hellman, Mountain View, CA (US); Teresa Lynn Roberts, Palo Alto, CA (US); Nadeem Mohammed Yusuf Ilkal, Mountain View, CA (US); Jason Paul Ridge, Frisco, TX (US); Matthew Glen Rice, Carlsbad, CA (US); Eric Young Pan, San Francisco, CA (US); Jeffrey M. Wolfe, Parrish, FL (US)

(73) Assignee: Intuit Inc., Mountain View, CA (US)

( * ) Notice: Subject to any disclaimer, the term of this patent is extended or adjusted under 35 U.S.C. 154(b) by 168 days.

(21) Appl. No.: 12/873,214

(22) Filed: Aug. 31, 2010

(65) Prior Publication Data
US 2012/0053965 A1     Mar. 1, 2012

(51) Int. Cl.
*G06Q 40/00* (2012.01)
(52) U.S. Cl. .............. 705/4; 705/40; 705/39; 705/1.1; 705/31; 705/35
(58) Field of Classification Search .............. 705/1.1, 705/4, 3, 17, 40, 31, 35, 39, 2, 45, 70, 26, 705/67, 317; 707/769, 781; 370/259, 244; 715/255
See application file for complete search history.

(56) References Cited

U.S. PATENT DOCUMENTS

2001/0037219 A1* 11/2001 Malik ........................ 705/2
2010/0161461 A1*  6/2010 McKernan et al. ........ 705/31

OTHER PUBLICATIONS

"Licensing, Lending and Losing Your Identity", Tomaszczuk, Carol M.; Ried-Barrett, Amber; Pane, Anna C.; Mortgage Banking , v 66 , n 12 , p. 30-32, 34, 36-37. Friday , Sep. 1, 2006.*

* cited by examiner

*Primary Examiner* — John H Holly
(74) *Attorney, Agent, or Firm* — Osha Liang LLP

(57) ABSTRACT

A method allowing a professional service provider to access client data stored in an online account without storing confidential account information by the professional service provider. In particular, the service provider may register the relationship with the client in a third party information transfer framework where the client approves such registration and download the data from the online account using the confidential account information in a temporary manner. The client data may be stored in a repository available to the service provider based on the relationship registration. In an example, a professional tax preparation software may include functionality to check for newly downloaded client data within the third party information transfer framework, notifying a tax accountant (i.e., the service provider), and may provide a one click access to import the client data directly into the client tax return.

28 Claims, 12 Drawing Sheets

Screenshot
300c

Activate Clients Log

11/19/2009  19:27:08 -- Invite Clients for 1099 Direct Download
    Cole, Natalie
      No email has been sent. Contact client at 213-715-2394. Client should go to 1099dropoff.com and sign in with their SSN and ZIP code. Then they'll sign in to their financial institution(s). Their 1099s will be downloaded to you.
    Lee, Spike
      No email has been sent. Contact client at 214-328-1719. Client should go to 1099Dropoff.com and sign in with their SSN and ZIP code. Then they'll sign in to their financial institution(s). Their 1099s will be downloaded to you.
    Buckley, William F.
      Not activated. Missing required data [SSN, ZIP code]. The last name, SSN, and ZIP code are required for the client to sign into 1099Dropoff.com.
    Moore, Mary T.
      Message prepared successfully. You will be notified if the email bounces.
    Nelson, William T.
      Message prepared successfully. You will be notified if the email bounces.
    Shatner, William T.

[Print Log]  [Close]

FIG. 3C

THIRD PARTY INFORMATION TRANSFER

BACKGROUND

A taxpayer typically has a large amount of information (e.g., related to a large number of stock sales, investment accounts, interest payments, payroll information) that needs to be entered into a tax return. This information already exists in electronic form at a financial institution. The taxpayer can download it personally and automatically import the information into the tax return if the tax return is prepared by the taxpayer using a personal tax preparation software, such as TurboTax™ (a registered trademark of Intuit Inc., Mountain View, Calif.). However, an accountant who may be hired to prepare the tax return on behalf of the taxpayer does not have access to the same information electronically without asking for the taxpayer login information to the financial institution, which the taxpayer may be very reluctant or unwilling to do. The alternative means of getting such information into the professionally prepared tax return, such as manual data entry, are awkward and time-consuming. Similar difficulties exist for other type of professional service provider (e.g., an insurance broker, a human resources broker, etc.) who would have the need to access client's data in an online account of a financial entity, such as an insurance company or medical provider.

SUMMARY

In general, in one aspect, the invention relates to a method for transferring a data item from a financial entity to a professional service provider. The method includes obtaining authorization from a service recipient to transfer the data item from the financial entity to the professional service provider, wherein the data item is stored in an online account held by the financial entity for the service recipient, creating, using a processor of a server computer, an information transfer registration record in response to obtaining the authorization, wherein the information transfer registration record comprises a service recipient identifier identifying the service recipient and a professional service provider identifier identifying the professional service provider, obtaining, from the service recipient, temporary financial entity credentials required to access the online account held by the financial entity for the service recipient, wherein the temporary financial entity credentials are stored in a data repository coupled to the server computer, retrieving, in response to receiving the temporary financial entity credentials from the service recipient, the data item from the financial entity using the temporary financial entity credentials, deleting, in response to retrieving the data item, the temporary financial entity credentials in the data repository, receiving an access request from the professional service provider to access the retrieved data item, authenticating, using the processor, the access request based on the information transfer registration record, and transmitting, in response to authenticating the access request, the retrieved data item to the professional service provider.

In general, in one aspect, the invention relates to a system for transferring a data item from a financial entity to a professional service provider. The system includes a processor, memory storing instructions executable by the processor, a data repository coupled to the processor and configured to store financial information comprising the data item, and a registration module executing on the processor as instructions configured for obtaining authorization from a service recipient to transfer the data item from the financial entity to the professional service provider, wherein the data item is stored in an online account held by the financial entity for the service recipient and creating an information transfer registration record in response to obtaining the authorization, wherein the information transfer registration record comprises a service recipient identifier identifying the service recipient and a professional service provider identifier identifying the professional service provider. The system also includes a service recipient interface executing on the processor as instructions configured for obtaining, from the service recipient, temporary financial entity credentials required to authenticate access to the online account held by the financial entity for the service recipient, wherein the temporary financial entity credentials is stored in the data repository, retrieving, in response to receiving a download command from the service recipient, the data item from the financial entity using the temporary financial entity credentials, and deleting, in response to retrieving the data item, the temporary financial entity credentials in the data repository. The system also includes a service provider interface executing on the processor as instructions configured for receiving an access request from the professional service provider to access the retrieved data item, authenticating the access request based on the information transfer registration record, and transmitting, in response to authenticating the access request, the retrieved data item to the professional service provider.

In general, in one aspect, the invention relates to a non-transitory computer readable storage medium embodying instructions executable by a computer to transfer a data item from a financial entity to a professional service provider. The instructions, when executed by the computer, includes functionality for obtaining authorization from a service recipient to transfer the data item from the financial entity to the professional service provider, wherein the data item is stored in an online account held by the financial entity for the service recipient, creating an information transfer registration record in response to obtaining the authorization, wherein the information transfer registration record comprises a service recipient identifier identifying the service recipient and a professional service provider identifier identifying the professional service provider, obtaining, from the service recipient, temporary financial entity credentials required to access the online account held by the financial entity for the service recipient, wherein the temporary financial entity credentials are stored in a data repository coupled to the computer, retrieving, in response to receiving the temporary financial entity credentials from the service recipient, the data item from the financial entity using the temporary financial entity credentials, deleting, in response to retrieving the data item, the temporary financial entity credentials in the data repository, receiving an access request from the professional service provider to access the retrieved data item, authenticating the access request based on the information transfer registration record, and transmitting, in response to authenticating the access request, the retrieved data item to the professional service provider.

Other aspects of the invention will be apparent from the following detailed description and the appended claims.

BRIEF DESCRIPTION OF DRAWINGS

FIGS. 3A through 3C show examples of client set up for third party information transfer in accordance with one or more embodiments of the invention.

DETAILED DESCRIPTION

Figure 1:
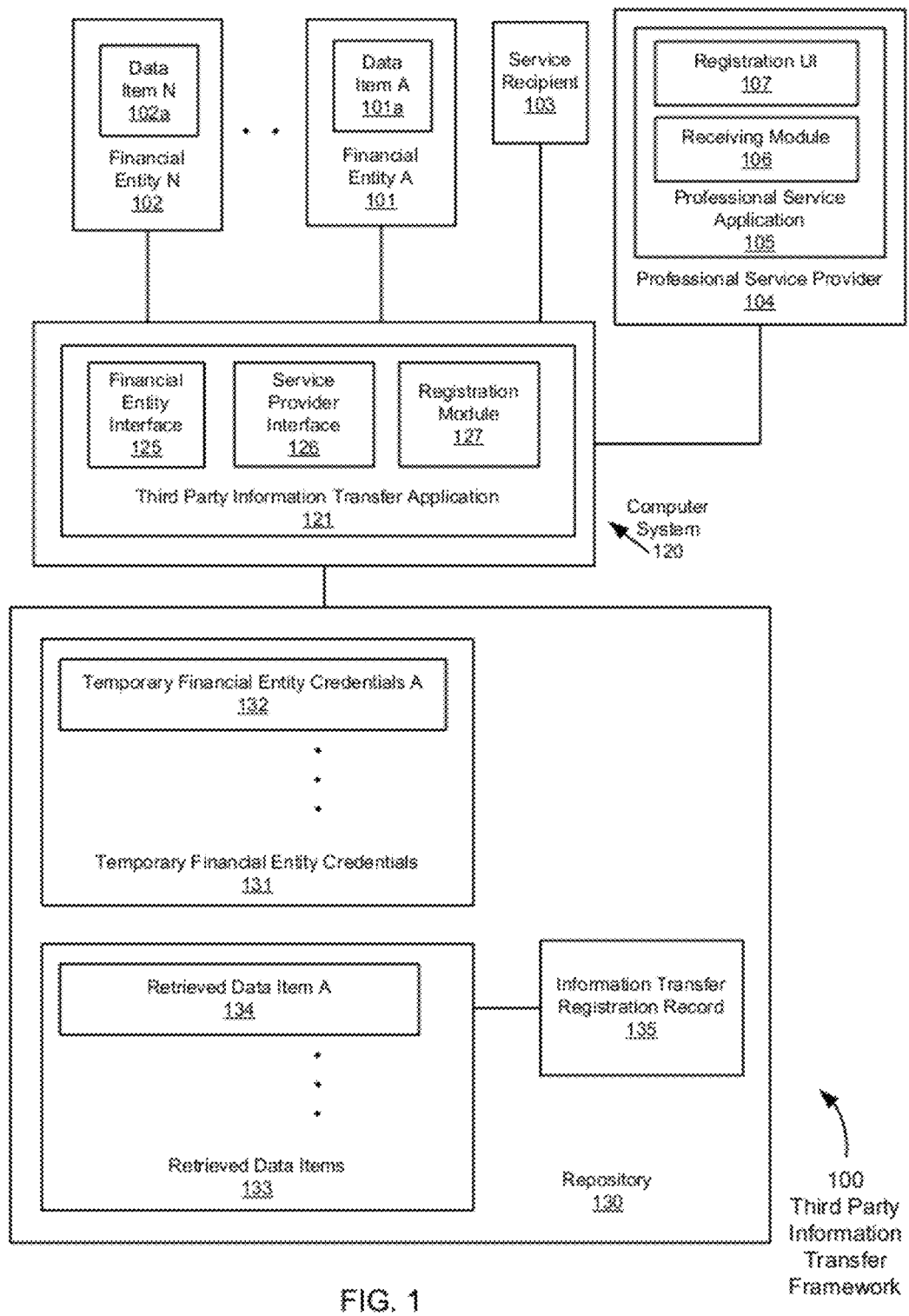
FIG. 1 shows a block diagram of a third party information transfer framework in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a system and method that allows a professional service provider to access client data stored in an online account held by a financial entity for the client without requiring the client to disclose confidential access credential for the online account to the professional service provider. In one or more embodiments, the service provider registers the relationship between the professional service provider and the client with a third party information transfer framework within which functionality is provided for the client to approve such registration and download the data from the financial entity using the confidential access credential in a temporary manner (i.e., the confidential access credential does not persist in the third party information transfer framework). The client data is then stored in a repository available to be accessed by the professional service provider based on the relationship registration. Accordingly, no person other than the client himself handles the confidential access credential, which is automatically deleted by the third party information transfer framework subsequent to downloading the client data.

In one or more embodiments, the client access to the third party information transfer framework is managed using a secondary access credential (e.g., last four digit of client social security number (SSN), zip code, last name, etc.) that is less sensitive than the access credential (e.g., including full SSN of the client) to the client's online account at the financial entity. In the case when all these secondary access credentials are not sufficient to uniquely identifies the client, the full SSN is then required.

In one or more embodiments, the downloaded client data is supplemented with related web scraped information for access by the professional service provider. For example, the downloaded client data may include the Tax Form 1099 containing stock sale information that the financial entity is required to prepare and report by the government tax agency. In particular, cost basis information is not required in the Tax Form 1099 (e.g., prior to year 2011) but may exist in other online format that can be obtained using web scraping technique. Because both stock sale information and cost basis information are required by a tax accountant to prepare the tax return for the client, providing the complementary web scraping functionality improves the completeness of client data and therefore streamlines the workflow for the professional service provider.

In one or more embodiments, a notification and/or a preview is sent to the professional service provider upon completion of the client data download allowing the professional service provider to confirm that the client data is correct and is not duplicated.

FIG. 1 depicts a schematic block diagram of a third party information transfer framework (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The third party information transfer framework (100) of FIG. 1 depicts the components of a third party information transfer framework in accordance with embodiments disclosed herein.

As shown in FIG. 1, the third party information transfer framework (100) includes financial entities (e.g., financial entity A (101) having data item A (101a), financial entity N (102) having data item N (102a), etc.), a service recipient (103), a professional service provider (104), and a computer system (120), all of which are coupled via a computer network (not shown). In particular, the computer network (not shown) may be the Internet, a wide area network, a local area network, WIFI, or any other suitable wired or wireless network. Further, the computer system (120) is installed with a third party information transfer application (121) having a financial entity interface (125), a service provider interface (126), and a registration module (127) while the professional service provider (104) includes a professional service application (105) having a receiving module (106) and a registration user interface (UI) (107). Furthermore, the third party information transfer framework (100) includes a repository (130) coupled to the computer system (120). The repository (130) may be a database, persistent storage, computer memory, or any other suitable type of storage device or management system. The repository stores temporary financial entity credentials (131) (e.g., temporary financial entity credentials A (132)), retrieved data items (133) (e.g., retrieved data item A (134)), and an information transfer registration record (135). Further, the financial entity A (101), a financial entity N (102), a service recipient (103), and a professional service provider (104) may each include a computing device (not shown) for communicating with the computer system (120) via the aforementioned computer network.

In one or more embodiments of the invention, a financial entity (e.g., financial entity A (101), financial entity N (102), etc.) may be any business concern (e.g., a government licensed business) providing financial related service (e.g., a banking service, an investment service, an auto insurance service, a medical insurance service, etc.) to the service recipient (103) (referred to as a customer of the financial entity) under a customer agreement entered into between the financial entity (e.g., financial entity A (101), financial entity N (102), etc.) and the service recipient (103).

For example, such financial entity may be a bank, security investment firm, insurance company, etc. In one or more embodiments, the financial entity (e.g., financial entity A (101), financial entity N (102), etc.) is configured to manage (e.g., generate, track, update, revise, or otherwise maintain) financial data (e.g., data item A (101a), data item N (102a), such as bank deposit/withdrawal records, interest accrual records, stock/bond purchase/sale records, dividends dispersing records, auto insurance claim records, medical insurance claim records, etc.) of the service recipient (103) under a confidentiality agreement within the aforementioned customer agreement. For example, such confidentiality agreement may allow data items (e.g., data item A (101a), data item N (102a)) of the service recipient (103) to be stored in an online account (not shown, e.g., checking/savings account, investment account, insurance policy account, etc.) where any access thereto is required to be authenticated using an access credential (referred to as financial entity access credential, such as user name, a password, a birth date, SSN, security questions, etc.). Once authenticated, the financial data (e.g., data item A (101a), data item N (102a)) can be downloaded to a computer and imported into a software application installed on the computer using pre-determined protocols specified in the customer agreement. For example, such pre-determined protocol may be based on an industry standard (e.g., open financial exchange (OFX) standard) or customized to a particular financial entity. Further, such pre-determined protocol may be based on techniques known to those skilled in the art.

In addition, the service recipient (103) may be a customer of multiple financial entities (e.g., financial entity A (101), financial entity N (102), etc.) where financial data (e.g., data item A (101a), data item N (102a)) of the service recipient (103) are stored in respective online accounts of the service recipient (103) at corresponding financial entities (e.g., financial entity A (101), financial entity N (102), etc.). Generally, each of the respective online accounts may be associated with separate access credentials specified by the service recipient (103) who guards these access credentials as highly confidential information. In one or more embodiments, the service recipient (103) may access any of these online accounts using a desktop computer, a notebook computer, a tablet computer, a smartphone, or other suitable computing device. In such embodiments, the service recipient (103) may access the computer system (120) using any of the aforementioned computer or computing devices.

In one or more embodiments of the invention, the service recipient (103) may be an individual or an entity. For example, the service recipient (103) may be a single person. In another example, the service recipient (103) may be a small business or an individual (e.g., partner, manager, employee, consultant, or other professional) associated with such small business. In one or more embodiments, the service recipient (103) is a customer of one or more of the business entities (e.g., financial entity A (101), financial entity N (102), etc.) and is also a client of the professional service provider (104).

In one or more embodiments of the invention, a professional service provider (e.g., professional service provider (104)) may be any business concern (e.g., a government licensed business) that uses the professional service application (105) (e.g., a software application such as an accounting application, tax preparation application, portfolio management application, insurance claim analysis application, etc.) to provide professional service (e.g., book keeping, tax preparation, wealth management, insurance claim management, etc.) to the service recipient (103). In such arrangement, the service recipient (103) is referred to as a client of the professional service provider (104)) and the professional service is provided under a client agreement entered into between the professional service provider (104)) and the service recipient (103). In one or more embodiments, the professional service application (105) may be installed and executing on a desktop computer, a notebook computer, a tablet computer, a smartphone, or other suitable computing device of the professional service provider (104).

For example, the professional service provider (104) may be a book keeper, tax accountant, wealth management consultant, insurance broker, etc. or a book keeping firm, tax accounting firm, wealth management consulting firm, insurance brokerage firm, etc. In one or more embodiments, the professional service provider (104)) is configured to prepare a professional work product (e.g., accounting ledger, tax return, wealth portfolio analysis report, claim resolution analysis report, etc.) for the service recipient (103). Generally, such professional work product is created based on financial data (e.g., data item A (101a), data item N (102a)) of the service recipient (103) stored in respective online accounts of the service recipient (103) at corresponding business entities (e.g., financial entity A (101), financial entity N (102), etc.).

For example, the accounting ledger may be created by a book keeper or book keeping firm based on bank deposit/withdrawal records, interest accrual records, etc. stored in online checking/savings account of the service recipient (103) at the financial entity A (101).

In another example, the tax return may be prepared by a tax accountant or tax accounting firm based on interest accrual records, stock/bond purchase/sale records, dividends dispersing records, etc. stored in online checking/savings account and investment account (e.g., checking/savings account, 401k account, IRA account, etc.) of the service recipient (103) at the financial entity A (101).

In yet another example, the wealth portfolio analysis report may be prepared by a wealth management consultant or wealth management consulting firm based on interest accrual records, stock/bond purchase/sale records, dividends dispersing records, etc. stored in online savings account and investment account of the service recipient (103) at the financial entity A (101)

In still another example, the claim resolution analysis report may be prepared by an insurance broker or insurance brokerage firm based on auto insurance claim records, medical insurance claim records, etc. stored in an online insurance policy holder account of the service recipient (103) at the financial entity A (101).

However, the aforementioned client agreement generally does not include provisions for the professional service provider (104) to obtain financial entity access credentials of the service recipient (103) for accessing the financial data (e.g., data item A (101a), data item N (102a)) electronically (e.g., from the financial entity A (101)). Because the professional service provider (104) does not have direct access to such financial data (e.g., data item A (101a), data item N (102a)), the professional service provider (104) is referred to as a third party with respect to the financial data (e.g., data item A (101a), data item N (102a)) and the financial data (e.g., data item A (101a), data item N (102a)) is referred to as the client financial data with respect to the professional service provider (104). In addition, providing such client financial data (e.g., data item A (101a), data item N (102a)) to the professional service provider (104) is referred to as third party information transfer. The request from the professional service provider (104) to access the client financial data (e.g., data item A (101a), data item N (102a)) is referred to as a third party request.

In one or more embodiments of the invention, a registration user interface (UI) (107) is presented to the professional service provider (104) or an individual associated with the professional service provider (104) to register, within the third party information transfer framework (100), a relationship between the professional service provider (104) and the service recipient (103). Specifically, the relationship is represented in the aforementioned client agreement. In one or more embodiments, the relationship is registered by submitting a service provider identifier of the professional service provider (104) and a service recipient identifier of the service recipient (103) to the computer system (120) for creating information transfer registration record (135). More specifically, these registered identifiers are submitted to the third party information transfer application (121) pending authorization from the service recipient (103). Once authorized, the information transfer registration record (135) is created that includes the service provider identifier of the professional service provider (104) and the service recipient identifier of the service recipient (103).

In one or more embodiments, the registration user interface (UI) (107) is integrated within the professional service application (105) as an embedded functional module that is configured to communicate with the registration module (127), for example via the aforementioned computer network. In one or more embodiments where the computer network includes the Internet, the registration user interface (UI) (107) is a first web based interface to access the registration module (127) of the third party information transfer application (121).

In one or more embodiments, the professional service application (105) is configured to request, based on the aforementioned registration, accessing client financial data (e.g., data item A (101a), data item N (102a)) stored in respective online accounts (not shown) of the service recipient (103) at corresponding financial entities (e.g., financial entity A (101), financial entity N (102), etc.). More details of creating the information transfer registration record (135) as well as requesting and receiving client financial data (e.g., data item A (101a), data item N (102a)) are described below in a system perspective.

In one or more embodiments of the invention, the third party information transfer application (121) includes the registration module (127) that is configured to receive, from the professional service provider (104), the service recipient identifier of the service recipient (103) and the service provider identifier of the professional service provider (104) for registering a relationship between the professional service provider (104) and the service recipient (103). As noted above, the relationship is represented in the aforementioned client agreement. In one or more embodiments, the registration module (127) is configured to communicate with the registration user interface (UI) (107) of the professional service application (105) for receiving these identifiers. In one or more embodiments, the registration module (127) is configured to present the aforementioned first web based user interface to the professional service provider (104) for receiving these identifiers.

In one or more embodiments, the registration module (127) is further configured to request and obtain authorization, in response to registering the aforementioned relationship, from the service recipient (103) to transfer the data item A (101a) from the financial entity A (101) to the professional service provider (104) based on the registration. In one or more embodiments, the registration module (127) is configured to send an electronic communication (e.g., email, text message, etc.) to the service recipient (103) that includes the request for authorization and an invitation to the service recipient (103) to access a second web based user interface for granting the authorization. For example, the second web based user interface may be presented to the service recipient (103) or an individual associated with the service recipient (103) via a web browser executing on a computer of the service recipient (103). Accordingly, the authorization may be obtained via the second web based user interface.

In one or more embodiments, the registration module (127) is further configured to create the information transfer registration record (135) in response to obtaining the authorization. In one or more embodiments, the information transfer registration record (135) includes the service recipient identifier of the service recipient (103) and the service provider identifier of the professional service provider (104). In one or more embodiments, the registration module (127) is further configured to store the information transfer registration record (135), in response to creating thereof, in the repository (130).

In one or more embodiments of the invention, the third party information transfer application (121) includes the financial entity interface (125) that is configured to download the data item A (101a) from the financial entity (101) and store in the repository (130) as the retrieved data item A (134). Specifically, the financial entity interface (125) is configured to receive, from the service recipient (103), a download command and information required to perform the download. For example, such information includes identification of the download source and access credential of the download source. In one or more embodiments, the service recipient (103) accesses the second web based interface to activate the download command while identifying the financial entity A (101) and providing his confidential access credential to the financial entity A (101) as the temporary financial entity credentials A (132), which is stored in the repository (130). In one or more embodiments, the download command may be activated by the service recipient (103) for multiple data items stored in multiple financial entities (e.g., financial entity A (101), financial entity N (102), etc.). Accordingly, multiple temporary financial entity credentials are stored in the repository (130) as the temporary financial entity credentials (131). For example, while the temporary financial entity credentials A (132) corresponds to the financial entity A (101), another temporary financial entity credentials (not shown) in the temporary financial entity credentials (131) may correspond to another financial entity (e.g., the financial entity N (102), etc.).

In one or more embodiments, the financial entity interface (125) is configured to retrieve, in response to receiving the download command, the data item A (101a) from the financial entity A (101) using the temporary financial entity credentials A (132). In one or more embodiments, the financial entity interface (125) is configured to communicate with the financial entity A (101) using the same pre-determined protocol (e.g., OFX standard) for downloading the stored data item A (101a) by the service recipient (103) as specified in the aforementioned customer agreement. Once downloaded, a copy of the data item A (101a) is stored in the repository as the retrieved data item A (134). In one or more embodiments, multiple data items from multiple financial entities (e.g., financial entity A (101), financial entity N (102), etc.) may be downloaded by the service recipient (103) and stored in the repository (130) as the retrieved data items (133). For example, while the retrieved data item A (132) is downloaded from the financial entity A (101), another retrieved data item (not shown) in the retrieved data items (133) may be downloaded from another financial entity (e.g., the financial entity N (102), etc.).

In one or more embodiments, the download command activated by the service recipient (103) identifies the service recipient (103). Accordingly, the retrieved data items (133) are associated with the information transfer registration record (135). For example, the association may be established using a tag, link, pointer, or other suitable reference embedded in the retrieved data items (133) and pointing to the information transfer registration record (135), or vice versa. In another example, the association may be established using a look up table (not shown) including an entry referencing both the retrieved data items (133) and the information transfer registration record (135).

In one or more embodiments, the financial entity interface (125) is configured to send a notification to the professional service provider (104) in response to completion of retrieving the data item A (101a). Accordingly, the service provider (104) is alerted as to the availability of client financial data (i.e., the retrieved data item A (134)). In one or more embodiments, the notification identifies the service recipient (103). In one or more embodiments, the notification identifies the financial entity A (101). In one or more embodiments, the notification identifies the client financial data (e.g., the data item A (101a)).

In one or more embodiments of the invention, the third party information transfer application (121) is configured to delete, in response to retrieving the data item A (101a), the corresponding temporary financial entity credentials A (132) in the repository (130). In one or more embodiments, each of the temporary financial entity credentials (131) (e.g., temporary financial entity credentials A (132)) persists in the repository (130) only during the time period of downloading the corresponding data item (e.g., data item A (101a)) from the corresponding financial entity (e.g., financial entity A (101)). Specifically, the temporary financial entity credentials A (132) does not persist from one download command to another download command. Said differently, multiple download commands to the same financial entity (e.g., financial entity A (101)) requires the service recipient (103) to repeat the same procedure of entering the applicable access credential as the temporary financial entity credentials A (132), which is deleted each time a download command is completed.

For example, if the first download command requests X number of data records in the data item A (101a) and the second download command requests Y number of data records in the data item A (101a), the temporary financial entity credentials A (132) is stored the first time for downloading the X data records and automatically deleted after the X data records download is completed. Further, the temporary financial entity credentials A (132) is stored the second time for downloading the Y data records and automatically deleted again after the Y data records download is completed.

In another example, the first download command requests downloading the data item A (101a) and the second download command requests downloading another data item from the same financial entity A (101), which may be different than the data item A (101a) or may be the same data item A (101a) again in a duplicated download. In this example, the temporary financial entity credentials A (132) is stored the first time for downloading the data item A (101) and automatically deleted after such download is completed. Further, the temporary financial entity credentials A (132) is stored the second time for downloading another data record and automatically deleted again after the second download is completed.

In one or more embodiments, the temporary financial entity credentials A (132) persists in the repository (130) for a pre-determined duration before it is deleted by the third party information transfer application (121) in the repository (130). In one or more embodiments, the temporary financial entity credentials A (132) persists in the repository (130) for a user specified duration before it is deleted by the third party information transfer application (121) in the repository (130). For example, the duration may be specified by the service recipient (103) via the second web interface. Further, the duration may include a number of activated download commands, a specified time period, or other means of defining the persistence period.

In one or more embodiments of the invention, the third party information transfer application (121) includes the service provider interface (126) that is configured to receive a request (i.e., third party request) from the professional service provider (104) to access client financial data (e.g., the retrieved data item A (132)) available from the third party information transfer application (121). For example, the request may be submitted by the professional service provider (104) when alerted by the aforementioned notification of download completion. In one or more embodiments, the request identifies the service recipient (e.g., service recipient (103)) and the professional service provider (e.g., professional service provider (104)). In one or more embodiments, the request further identifies the source of the requested client financial data (e.g., financial entity A (101a) and/or data item A (101a)). In alternative embodiments, the request does not specify the source of the client financial data. Said in other words, the request does not specify whether the data item A (101a) or some other data item (not shown) is to be accessed.

In one or more embodiments, the service provider interface (126) is configured to authenticate the request based on the information transfer registration record (135). Specifically, the request is authenticated by matching the request to the service recipient identifier and the professional service provider identifier in the information transfer registration record (135). Said in other words, the request is authenticated if the service recipient (e.g., service recipient (103)) and the professional service provider (e.g., professional service provider (104)) specified by the request matches the service recipient identifier and the professional service provider identifier in the information transfer registration record (135).

In one or more embodiments, the service provider interface (126) is configured to transmit, in response to authenticating the request, the retrieved data item A (134) to the professional service provider (104). In one or more embodiments, the service provider interface (126) is configured to send a preview of the retrieved data item A (134) to the professional service provider (104) prior to transmit the entire portion of the summary portion of the retrieved data item A (134). For example, the preview may include a summary portion allowing the professional service provider (104) to confirm whether the data item A (134) is correct or not duplicated with respect to the request. In one or more embodiments, the entire portion of the retrieved data item A (134) is transmitted to the professional service provider (104) in response to preview confirmation therefrom.

In one or more embodiments, the preview is imported into the professional service application (105) and is presented to the professional service provider (104) or an individual associated with the professional service provider (104) upon starting the professional service application (105) to work on the professional work product for the service recipient (103). Once the preview is confirmed, the entire portion of the retrieved data item A (134) is then imported into the professional service application (105).

In one or more embodiments, the service recipient (103) may activate multiple download commands causing multiple retrieved data items (e.g., retrieved data item A (134), etc.) to be available for access by the professional service provider (104). In such embodiments, the preview also allows the professional service provider (104) to select one or more of such multiple retrieved data items (e.g., retrieved data item A (134), etc.) for access (e.g., importing into the professional service application (105)).

In one or more embodiments of the invention, the computer system (120) may be operated by an application service provider (not shown). In one or more embodiments, the application service provider (not shown) may be the same as the provider of the professional service application (105). In such embodiments, the computing device installed with the professional service application (105) may be part of the computer system (120) where the professional service provider (104) may access an online configuration of the professional service application (105). In alternative embodiments, the application service provider (not shown) is separate from the provider of the professional service application (105). The computer system may be any computing device suitable for hosting the third party information transfer application (121), such as, for example, a server computer, a desktop system, a thin computer, a laptop, a hand-held computing device such as a smart phone or any other suitable computing device.

Although only one service recipient (103) and one professional service provider (104) are shown in the third party information transfer framework (100), more than one service recipient each as a client of one or more professional service provider and more than one professional service provider each having one or more service recipient as its client may be included in the third party information transfer framework (100). In such scenario of multiple service recipients and multiple professional service providers, the data structure of the temporary financial entity credentials (131), retrieved data items (133), and information transfer registration record (135) are duplicated for organizing additional sets of information each associated with a particular pair of service recipient and professional service provider. In particular, each such pair is associated with a corresponding relationship represented in a client agreement entered into between the service recipient and professional service provider of the pair.

Figure 2:
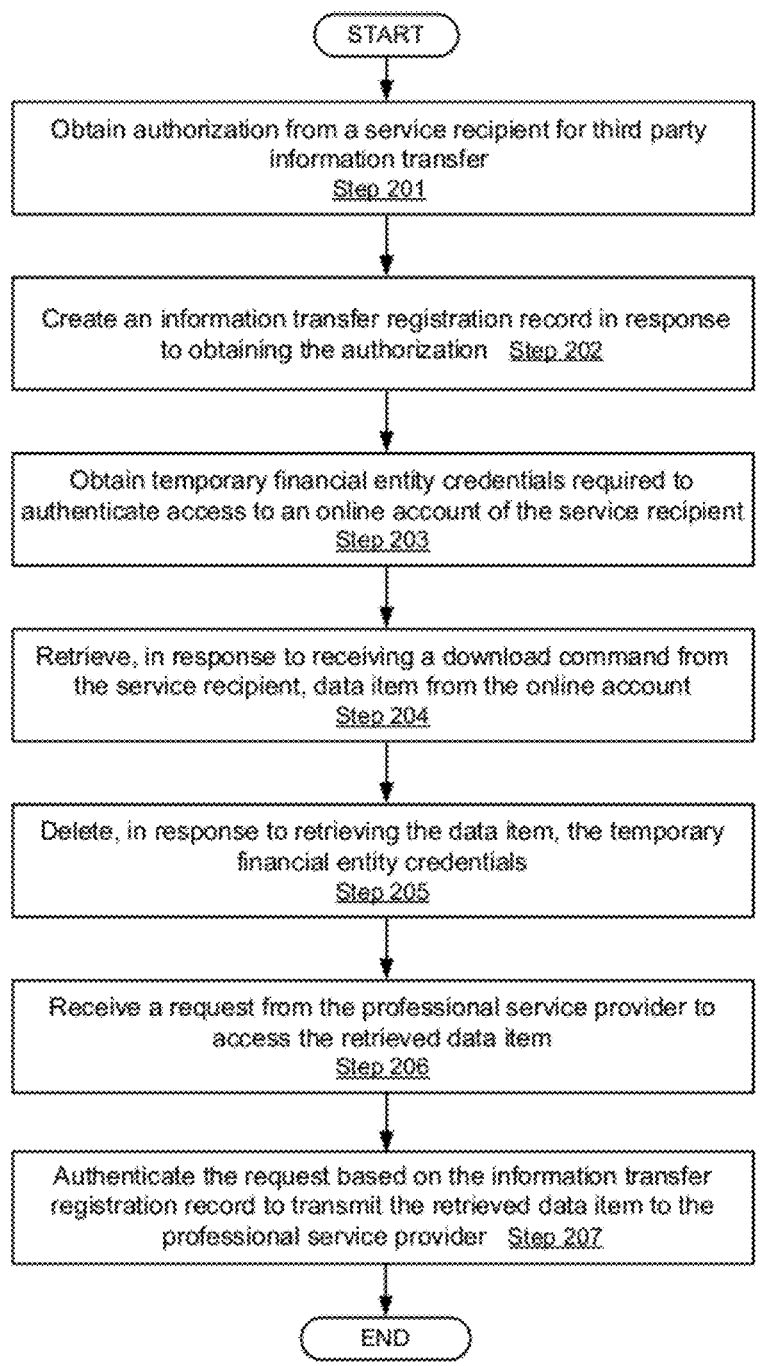
FIG. 2 shows a flowchart of a method for third party information transfer in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

Initially in Step 201, an authorization for third party information transfer is obtained from a service recipient. In one or more embodiments, the authorization is obtained based on (1) obtaining a service recipient identifier and a professional service provider identifier from a professional service provider for registering a relationship between the professional service provider and the service recipient and (2) in response to registering the relationship, requesting the authorization from the service recipient to transfer a data item stored in an online account held by a financial entity for the service recipient to the professional service provider. In one or more embodiments, a web based user interface is provided for obtaining the authorization from the service recipient. In one or more embodiments, an electronic communication (e.g., email) is sent to the service recipient including an invitation to the service recipient to access the web based user interface for granting the authorization.

In one or more embodiments, the professional service provider and identifier thereof, the service recipient and identifier thereof, the relationship, the data item, the financial entity, and the web based user interface are those described in reference to FIG. 1 above.

In Step 202, an information transfer registration record is created in response to obtaining the authorization. In one or more embodiments, the information transfer registration record includes the service recipient identifier and the professional service provider identifier described in reference to FIG. 1 above.

In Step 203, temporary financial entity credentials is obtained from the service recipient that is required to authenticate access to the online account held by the financial entity for the service recipient. In one or more embodiments, the aforementioned electronic communication further includes an invitation to the service recipient to access the web based user interface for sending/providing such temporary financial entity credentials. For example, the temporary financial entity credentials are the same as that described in reference to FIG. 1 above.

In one or more embodiments, the aforementioned electronic communication further includes an invitation to the service recipient to access the web based user interface for sending a download command for accessing the online account held by the financial entity for the service recipient.

In Step 204, in response to receiving the download command from the service recipient, the data item is retrieved from the financial entity using the temporary financial entity credentials. In one or more embodiments, the retrieved data item is associated with the service recipient identifier, In Step 205, in response to retrieving the data item, the temporary financial entity credentials are deleted in the repository. In one or more embodiments, a notification is sent to the professional service provider in response to completion of retrieving the data item.

In one or more embodiments, retrieving the data item, deleting the temporary financial entity credentials, and sending the notification are the same as described in reference to FIG. 1 above.

In Step 206, in response to the notification, a request is received from the professional service provider to access the retrieved data item. In one or more embodiments, the request identifies the service recipient and the professional service provider. In Step 207, the request is authenticated based on the information transfer registration record by matching the request to the service recipient identifier and the professional service provider identifier. Once the request is authenticated, the retrieved data item is transmitted to the professional service provider.

In an example, the service recipient includes a taxpayer, the professional service provider includes a tax accountant, the data item includes a tax data item, and the tax accountant prepares a tax return for the taxpayer using a professional tax preparation application and the tax data item in response to transmitting the retrieved data item to the professional service provider.

In another example, the service recipient includes an insurance policy holder, the professional service provider includes an insurance broker, the data item includes an insurance claim data item, and the insurance broker prepares a claim resolution analysis report for the insurance policy holder using a professional claim analysis application and the insurance claim data item in response to transmitting the retrieved data item to the professional service provider.

FIGS. 3A-4F depict screen shots of an application example in accordance with one or more embodiments of the invention. This example application may be practiced using the third party information transfer framework (100) of FIG. 1 and based on the method described with respect to FIG. 2 above.

The example depicted in FIGS. 3A-3E includes a tax accounting firm "ACME tax accounting" (i.e., the professional service provider (104) described in reference to FIG. 1 above) registering its client at the third party information transfer service "1099 Dropoff" (i.e., the third party information transfer application (121) described in reference to FIG. 1 above) for third party download of TAX FORM 1099 (i.e., the data item A (101a) described in reference to FIG. 1 above) from various financial institutions (i.e., the financial entity A (101), financial entity N (102), etc. described in reference to FIG. 1 above) where the clients hold their accounts. In particular, a tax accountant Cheryl at the tax accounting firm "ACME tax accounting" uses a professional tax preparation software (i.e., the professional service application (105) described in reference to FIG. 1 above, e.g., "Lacerte™" (a registered trademark of Intuit Inc., Mountain View, Calif.)) to prepare a tax return for a client "Pat Smith" (i.e., the service recipient (103) described in reference to FIG. 1 above). In one or more embodiments, one or more of the screenshots (300a)-(300c) shown in FIGS. 3A-3C may be presented to Cheryl when she logs into a website of the third party information transfer service "1099 Dropoff". In one or more embodiments, one or more of the screenshots (300a)-(300c) shown in FIGS. 3A-3C may be presented to Cheryl within the professional tax preparation software, which in turn communicates with the third party information transfer service "1099 Dropoff" for completing the registration.

Figure 3A:
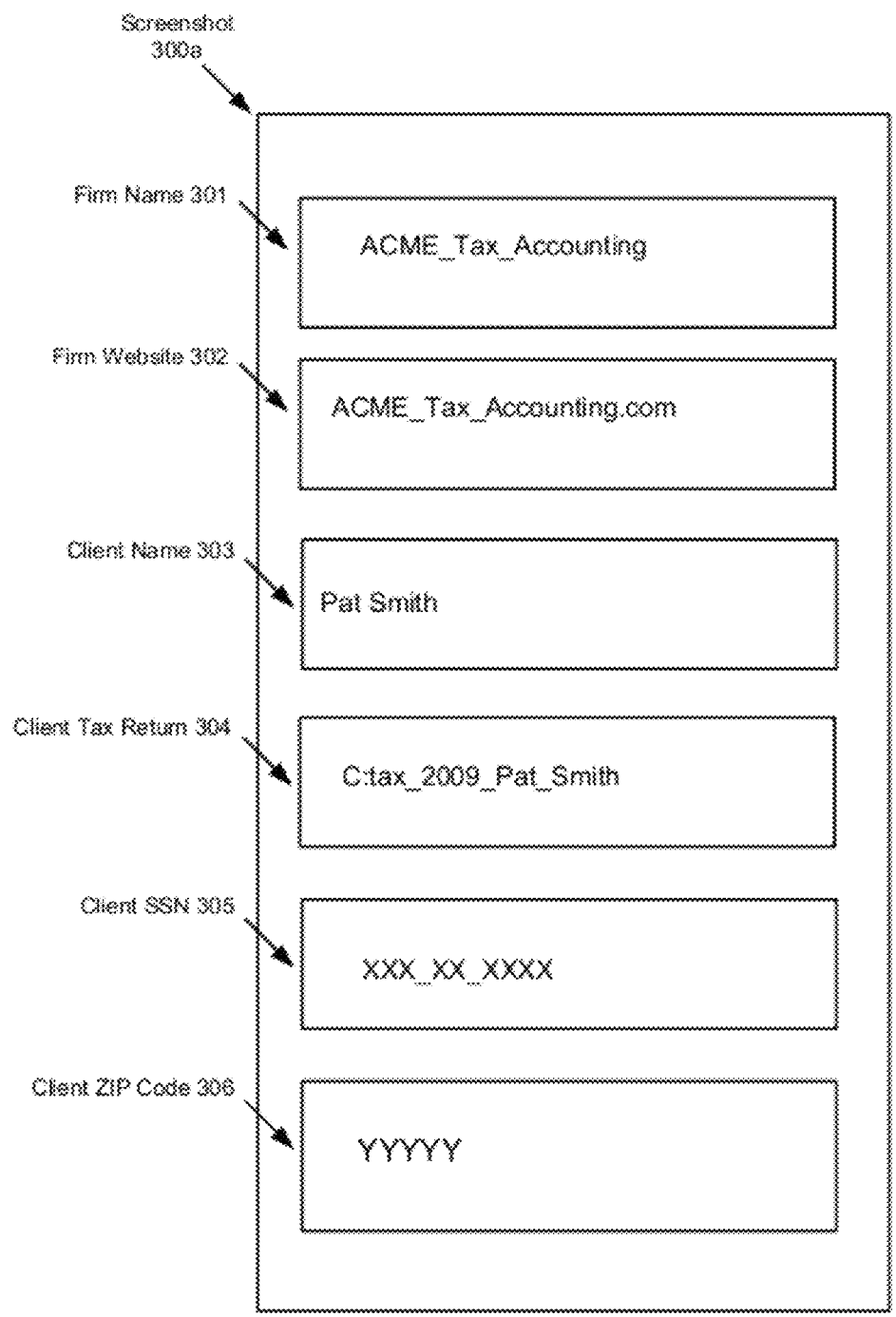

FIG. 3A depicts a screenshot (300a) of a registration user interface (e.g., the registration UI (107) described in reference to FIG. 1 above) for the Accountant Cheryl to register her client Pat for the third party information transfer service "1099 Dropoff". As shown, data entry fields (301)-(306) allows Cheryl or other staff at ACME tax accounting to enter the firm name, firm web address, client name, client tax return within the professional tax preparation software, client SSN, and client ZIP code, respectively, for registering the relationship between ACME tax accounting and the client Pat Smith in the third party information transfer service "1099 Dropoff". In one or more embodiments, one or more of the data entry fields (301)-(306) may be auto-filled using firm information and/or client information within the professional service application. In one or more embodiments, one or more of the firm name (301) and firm website (302), or representations thereof, may be included in the professional service provider identifier described in reference to FIG. 1 above. In one or more embodiments, one or more of the client name (303), client tax return (304), client SSN (305), and client ZIP code (306), or representations thereof, may be included in the service recipient identifier described in reference to FIG. 1 above.

Figure 3B:
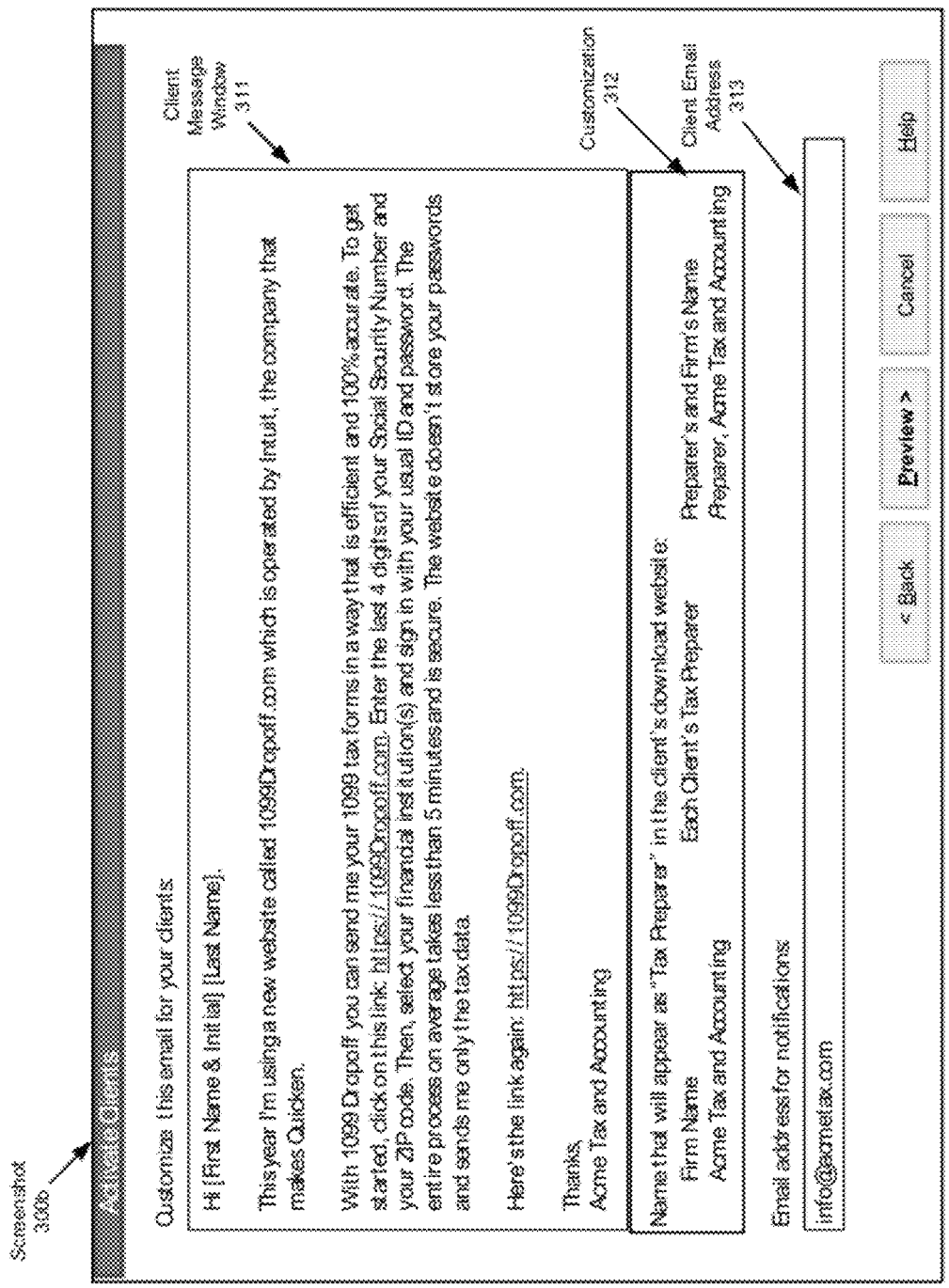

FIG. 3B depicts a screenshot (300b) of the registration user interface (e.g., the registration UI (107) described in reference to FIG. 1 above) for the Accountant Cheryl to invite her client Pat to authorize the third party information transfer service "1099 Dropoff". As shown, an email is drafted based on data entered using the client message window (311), the customization (312), and the client email address (313) for sending to Pat inviting him to sign into a website of the third party information transfer service "1099 Dropoff" to authorize downloading his TAX FORM 1099 based on the registration completed using the registration user interface depicted in FIG. 3A above.

FIG. 3C depicts a screenshot (300c) of the registration user interface (e.g., the registration UI (107) described in reference to FIG. 1 above) for showing a status log of registering multiple clients of the ACME tax accounting with the third party information transfer service "1099 Dropoff". As shown, email invitation has not been sent to Natalie Cole and Spike Lee for inviting them to authorize the registration, registration for William F. Buckley has not been not activated (i.e., not completed) due to missing required registration information, messages have been sent to Mary T. Moore and William T. Nelson for inviting them to authorize the TAX FORM 1099 download, etc.

Figure 4A:
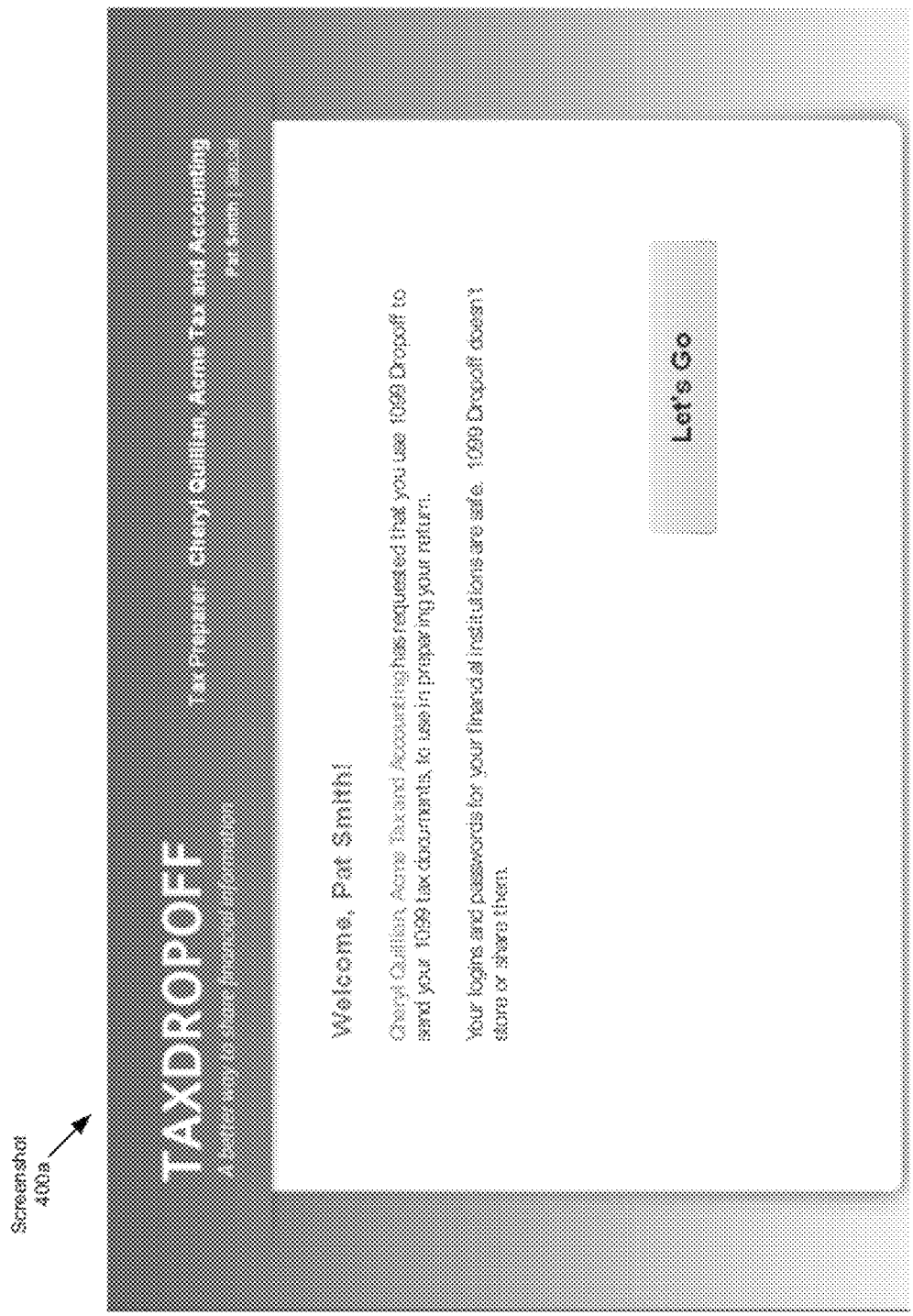
FIGS. 4A through 4F show examples of third party information transfer in accordance with one or more embodiments of the invention.

The example depicted in FIGS. 4A-4F includes the client Pat Smith of ACME tax accounting using the third party information transfer service "1099 Dropoff" for third party download of TAX FORM 1099 from various financial institutions where Pat holds his accounts. In particular, the downloaded TAX FORM 1099s are transmitted to the tax account Cheryl at ACME tax accounting to prepare a tax return for Pat FIG. 4A depicts a screenshot (400a) of receiving an invitation email by Pat Smith from ACME tax accounting to use the third party information transfer service "1099 Dropoff" for third party download. In one or more embodiments, the invitation email is prepared by the account Cheryl as described in reference to FIG. 3B above. In particular, the invitation indicates that account access credential will not be stored upon completion of the third party information transfer. Upon being invited, Pat goes to the website 1099Dropoff. com and signs in using the last 4 digits of his SSN and his ZIP code. In most cases, this is enough to identify him uniquely. In case there is ambiguity, he is asked for his last name and finally for his complete SSN. When the website 1099Dropoff. com can identify him uniquely, it shows his full name and his accountant's name Cheryl and firm ACME tax accounting, as confirmation that the identification is correct.

Figure 4B:
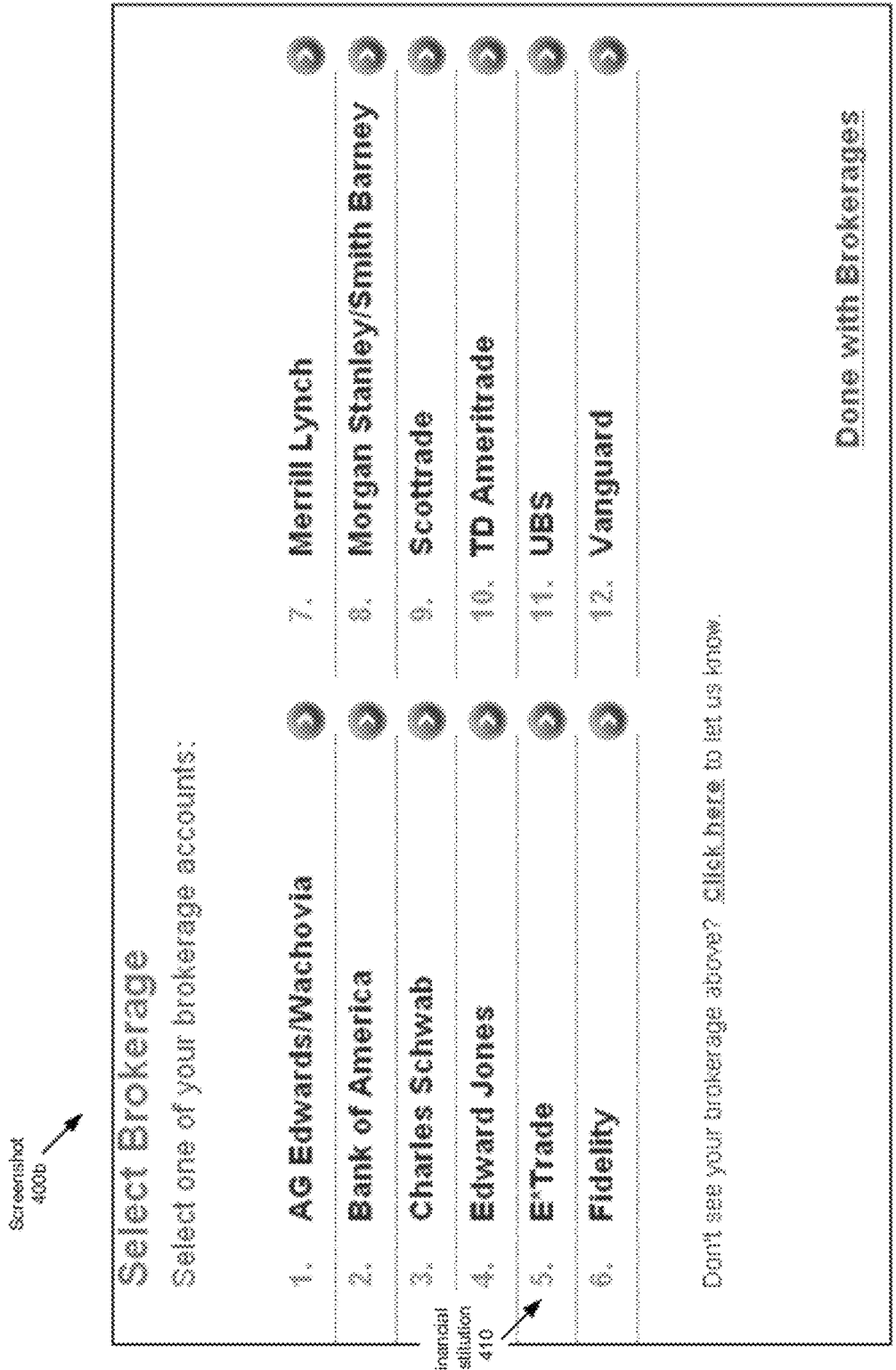
Figure 4C:
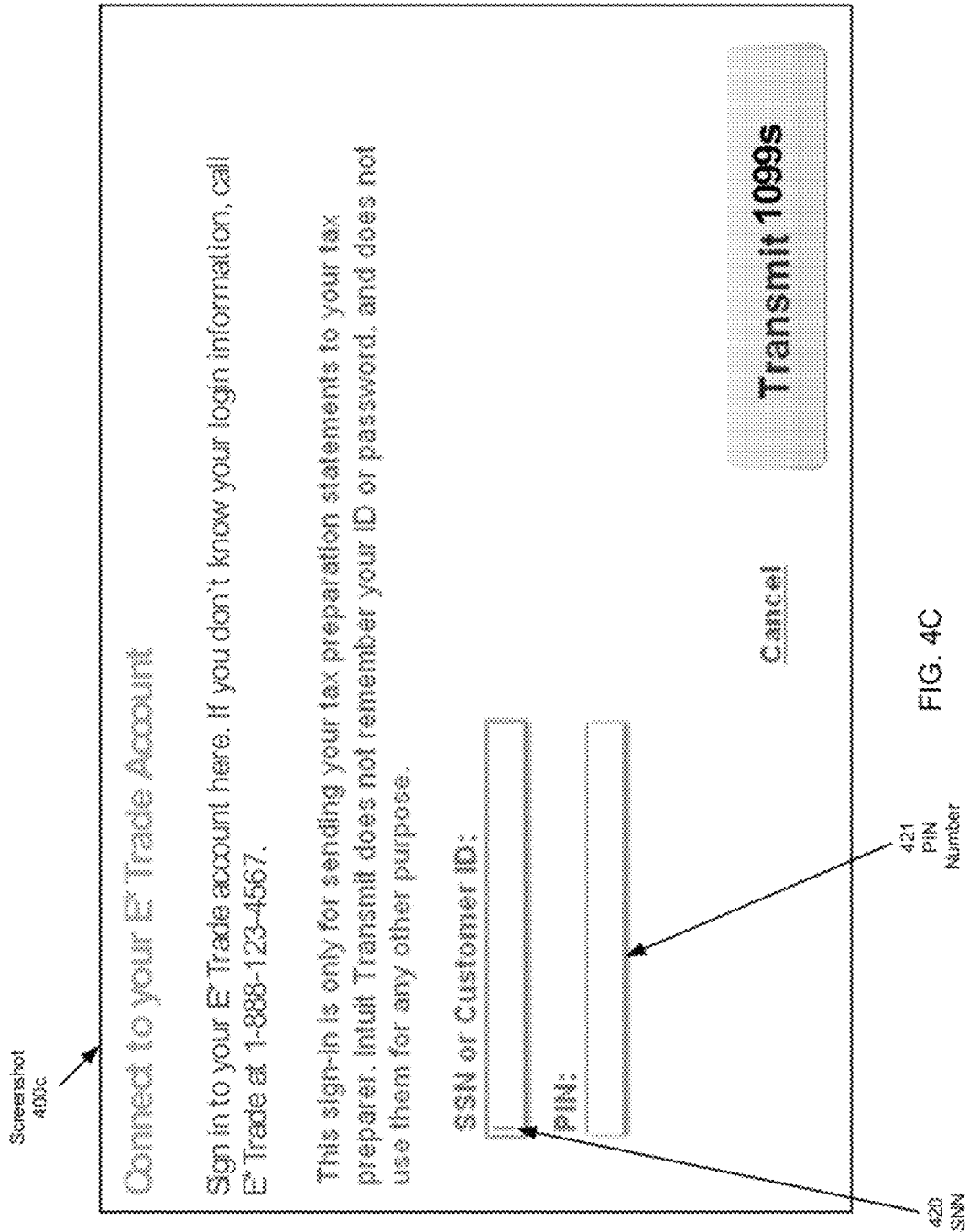
Figure 4D:
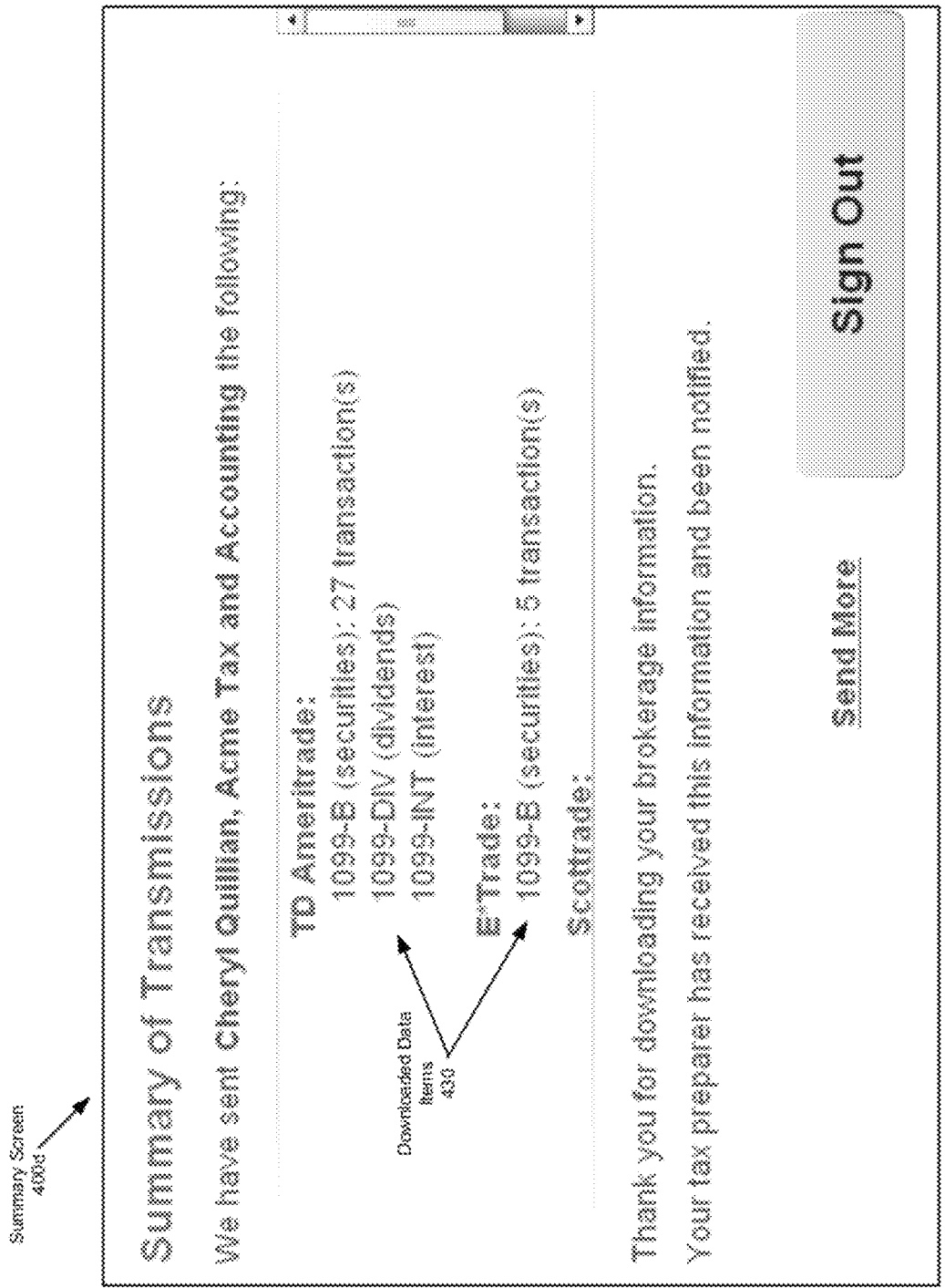

FIG. 4B depicts a screenshot (400b) of a selection menu for selecting one or more financial entities where Pat holds his accounts. Using this selection menu, Pat chooses the institutions that he gets 1099 tax information from, one at a time. He enters his credentials (e.g., SSN (420) and pin number (421), etc.) for a chosen financial institution (410) (e.g., E*Trade) as shown in the screenshot (400c) depicted in FIG. 4C. In some cases, other security questions may be required by some institutions in additiona to the SSN (420) and pin number (421). Pat waits while E*Trade downloads his information to the website 1099Dropoff.com, which is intermediate to transmitting it to the accountant Cheryl. After downloads are completed from all of Pat's selected institutions, he sees a summary screen (400d) depicted in FIG. 4D showing what was downloaded (e.g., downloaded data items (430) and has the opportunity to print that listing as confirmation.

In one or more embodiments, the information downloaded from E*Trade can come from two sources. One is an online 1099 form in OFX XML format. That may not be complete, however, and usually does not contain cost basis information. The second source is from web-scraping on Pat's account page on the E*Trade website to fill in the missing information, in particular the cost basis information.

In one or more embodiments, the information transmitted to the accountant Cheryl also identifies what client the information is for. In one or more embodiments, the professional tax preparation software checks for downloads periodically (e.g., every 15 minutes). If Cheryl is actually waiting for the download, she can invoke a command to have the professional tax preparation software check immediately.

Figure 4E:
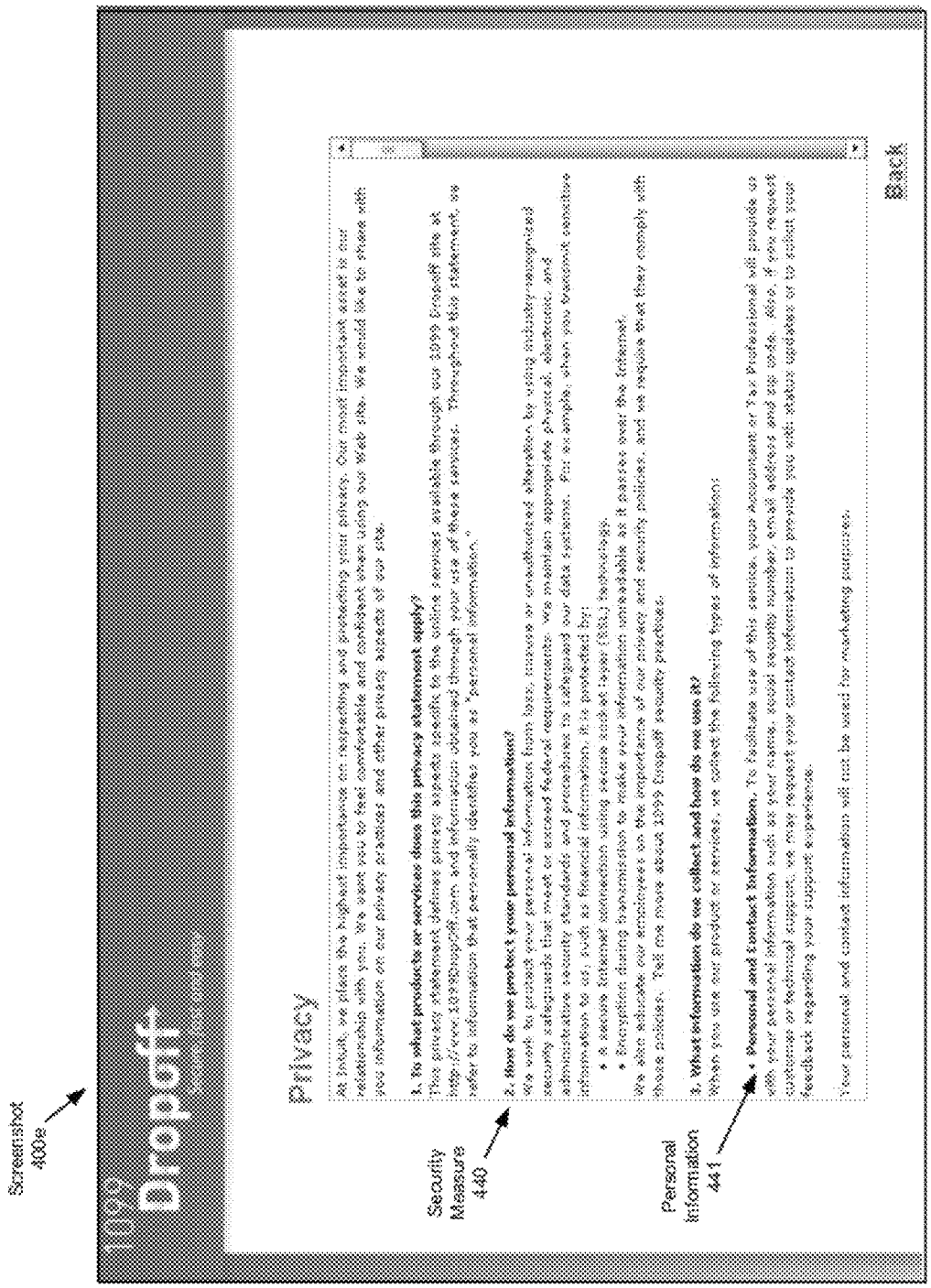

FIG. 4E depicts a screenshot (400e) of a privacy statement presented from the third party information transfer service "1099 Dropoff" to Pat. As shown, the privacy statement indicates that personal information (441) is provided from ACME tax accounting to the website 1099Dropoff.com regarding Pat and how the personal information and access credentials of Pat are protected (e.g., based on the security measure (440)) by the third party information transfer service "1099 Dropoff". For example, once the download from E*Trade is completed, Pat signs out his online account and the access credentials (e.g., SSN, pin number, and additional security questions if any, etc.) to access Pat's online account at E*Trade are deleted. Pat would have to re-enter the access credentials again next time when he needs to transfer other information to the third party information transfer service "1099 Dropoff".

Figure 4F:
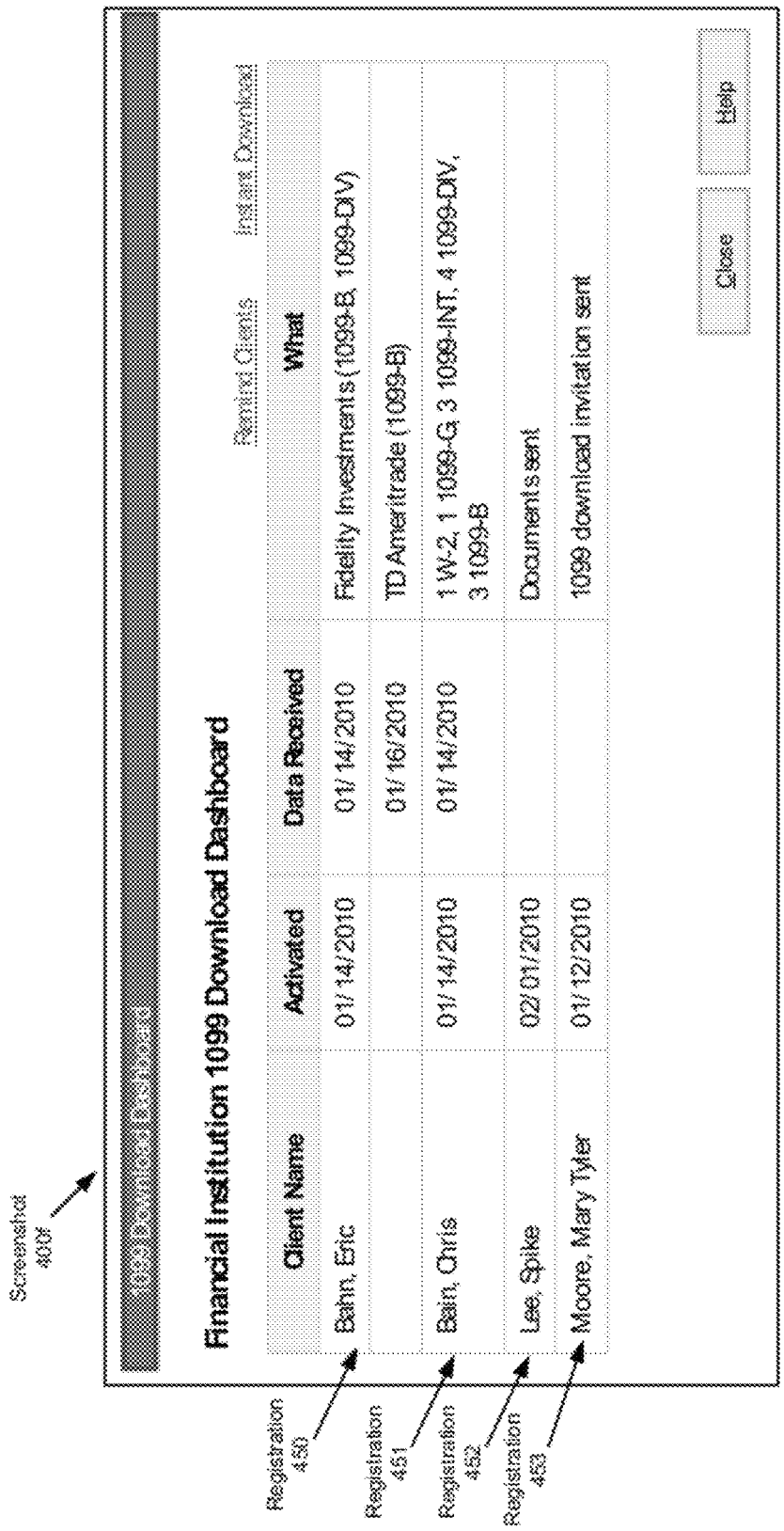

FIG. 4F depicts a screenshot (400f) of a status log of receiving multiple downloaded client data of the ACME tax accounting from the third party information transfer service "1099 Dropoff". In one or more embodiments, such status log is generated by the registration module (107), the receiving module (106), or combinations thereof described in reference to FIG. 1 above. As shown, registrations (450, 451) for clients Eric Bahn and Chris Bain have been activated (i.e., completed) on Jan. 14, 2010, the registration (452) for the client Spike Lee has been activated on Feb. 1, 2010, and the registration (453) for the client Mary Tyler Moore has been activated on Jan. 12, 2010. Further as shown, client data of (1) TAX FORMs 1099-B and 1099-DIV and (2) TAX FORM 1099-B have been downloaded by the client Eric Bahn from Fidelity Investments and TD Ameritrade, respectively, to the third party information transfer service "1099 Dropoff", from which the client data were transmitted to the ACME tax accounting on Jan. 14, 2010 and Jan. 16, 2101, respectively. In particular, the TAX FORMs 1099-B and 1099-DIV have been imported into the tax return for Eric Bahn in the professional tax preparation application (e.g., "Lacerte™" (a registered trademark of Intuit Inc., Mountain View, Calif.)). Similarly, client data of one W-2 form, one TAX FORM 1099-G, three TAX FORMs 1099-INT, four TAX FORMs 1099-DIV, and three TAX FORMs 1099-B have been downloaded by the client Chris Bain from multiple accounts or multiple financial entities to the third party information transfer service "1099 Dropoff", from which the client data has been transmitted to the ACME tax accounting. In particular, these client data have been imported into the tax return for Chris Bain in the professional tax preparation application (e.g., "Lacerte™" (a registered trademark of Intuit Inc., Mountain View, Calif.)). In addition, client data for Spike Lee has been downloaded by Spike to the third party information transfer service "1099 Dropoff" and available for access by ACME tax accounting. Further, 1099 client data download invitation has been sent to client Mary Tyler Moore but Mary has not yet responded to the invitation, i.e., Mary has yet not performed the download using the third party information transfer service "1099 Dropoff".

In one or more embodiments, when Cheryl opens Pat's tax return in the professional tax preparation software, she sees a preview of the forms that are transmitted from the website 1099dropoff.com. She can accept them all, defer some, or completely delete some that should never be imported. This preview shows the account number and name of the form, so duplications can be eliminated (e.g., Pat may have done the download twice, or Cheryl may have received the form previously from a separate source). In addition, the name on the account may also be included in the preview, so Cheryl can eliminate spousal accounts in "Married Filing Separately" cases and eliminate children's custodial accounts. Corrected forms are marked. In addition for TAX FORM 1099-B, the number of transactions that are missing cost basis may also be included in the preview alerting Cheryl regarding the need to obtain the missing cost basis.

Accordingly, Cheryl selects which forms to import and which particular tax preparation program to import them. To the extent possible, duplication with what's already in the tax return is eliminated. Where there is duplication, records that contain manual entries are used first while downloaded data is used over scanned data. If there are missing fields, such as cost basis, those fields are highlighted so that the tax preparation program can assist Cheryl to address them during review of the tax return.

Figure 5:
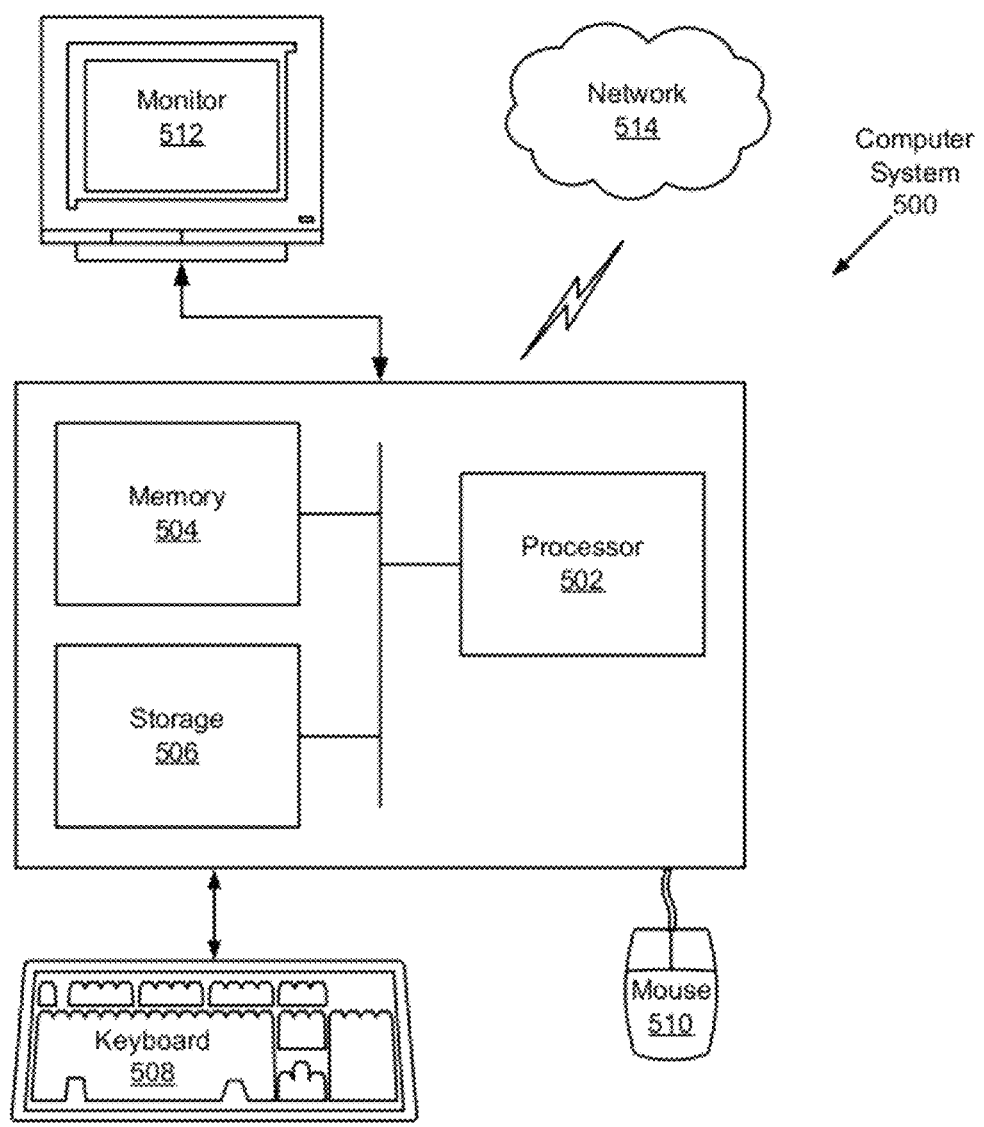
FIG. 5 shows a diagram of a computer in accordance with one or more embodiments of the invention.

Embodiments of the invention may be implemented on virtually any type of computer regardless of the platform being used. For example, as shown in FIG. 5, a computer system (500) includes one or more processor(s) (502) such as a central processing unit (CPU), integrated circuit, or other hardware processor(s), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor ((512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various elements of the computer system (120), the repository (130), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer storage readable medium such as a compact disc (CD), a diskette, a tape, a magnetic disk, or any other non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transferring a data item from a financial entity to a professional service provider, comprising:
  obtaining authorization from a service recipient to transfer the data item from the financial entity to the professional service provider, wherein the data item is stored in an online account held by the financial entity for the service recipient, wherein the online account exists prior to obtaining authorization from the service recipient;
  creating, using a processor of a server computer, an information transfer registration record in response to obtaining the authorization, wherein the information transfer registration record comprises a service recipient identifier identifying the service recipient and a professional service provider identifier identifying the professional service provider;

obtaining, from the service recipient, temporary financial entity credentials required to access the online account held by the financial entity for the service recipient, wherein the temporary financial entity credentials are stored in a data repository coupled to the server computer;

retrieving, in response to receiving the temporary financial entity credentials from the service recipient, the data item from the financial entity using the temporary financial entity credentials;

deleting, in response to retrieving the data item, the temporary financial entity credentials in the data repository, wherein the online account exists after deleting the temporary financial entity credentials;

receiving an access request from the professional service provider to access the retrieved data item;

authenticating, using the processor, the access request based on the information transfer registration record; and transmitting, in response to authenticating the access request, the retrieved data item to the professional service provider.

2. The method of claim 1, further comprising:
associating the retrieved data item with the service recipient identifier,
wherein the access request identifies the service recipient and the professional service provider, and
wherein authenticating the access request based on the information transfer registration record comprises matching the access request to the service recipient identifier and the professional service provider identifier.

3. The method of claim 1, further comprising:
receiving the service recipient identifier and the professional service provider identifier from the professional service provider for registering a relationship between the professional service provider and the service recipient; and
requesting the authorization from the service recipient, in response to registering the relationship, to transfer the data item from the financial entity to the professional service provider.

4. The method of claim 3, further comprising:
providing a web based user interface for obtaining the authorization from the service recipient via a mobile device of the service recipient,
wherein requesting the authorization comprises sending an electronic communication to the service recipient, the electronic communication comprising an invitation to the service recipient to access the web based user interface for granting the authorization.

5. The method of claim 3, further comprising:
providing a web based user interface for obtaining the temporary financial entity credentials and receiving the download command from the service recipient,
wherein requesting the authorization comprises sending an electronic communication to the service recipient, the electronic communication comprising an invitation to the service recipient to access the web based user interface for sending the temporary financial entity credentials and the download command.

6. The method of claim 5, further comprising:
sending a notification to the professional service provider in response to retrieving the data item,
wherein the access request is received from the professional service provider in response to sending the notification.

7. The method of claim 1, further comprising:
storing the information transfer registration record, in response to creating thereof, in a data repository coupled to the server computer; and
storing the retrieved data item, in response to generation thereof, in the data repository.

8. The method of claim 1,
wherein the service recipient is a taxpayer,
wherein the professional service provider is a tax accountant,
wherein the data item comprises a tax data item, and
wherein the tax accountant prepares a tax return for the taxpayer using a professional tax preparation application and the tax data item.

9. The method of claim 1,
wherein the service recipient is an insurance policy holder,
wherein the professional service provider is an insurance broker,
wherein the data item comprises an insurance claim data item, and
wherein the insurance broker prepares a claim resolution analysis report for the insurance policy holder using a professional claim analysis application and the insurance claim data item.

10. A system for transferring a data item from a financial entity to a professional service provider, comprising:
a processor;
memory storing instructions executable by the processor;
a data repository coupled to the processor and configured to store financial information comprising the data item;
a registration module executing on the processor as instructions configured for:
obtaining authorization from a service recipient to transfer the data item from the financial entity to the professional service provider, wherein the data item is stored in an online account held by the financial entity for the service recipient, wherein the online account exists prior to obtaining authorization from the service recipient, and
creating an information transfer registration record in response to obtaining the authorization, wherein the information transfer registration record comprises a service recipient identifier identifying the service recipient and a professional service provider identifier identifying the professional service provider;
a service recipient interface executing on the processor as instructions configured for:
obtaining, from the service recipient, temporary financial entity credentials required to authenticate access to the online account held by the financial entity for the service recipient, wherein the temporary financial entity credentials is stored in the data repository,
retrieving, in response to receiving a download command from the service recipient, the data item from the financial entity using the temporary financial entity credentials, and
deleting, in response to retrieving the data item, the temporary financial entity credentials in the data repository, wherein the online account exists after deleting the temporary financial entity credentials;
a service provider interface executing on the processor as instructions configured for:
receiving an access request from the professional service provider to access the retrieved data item, authenticating the access request based on the information transfer registration record, and transmitting, in response to authenticating the access request, the retrieved data item to the professional service provider.

11. The system of claim 10, wherein the data repository is further configured to store the information transfer registration record, the temporary financial entity credentials, and the retrieved data item.

12. The system of claim 10, wherein the financial entity interface is further configured for:

associating the retrieved data item with the service recipient identifier, wherein the access request identifies the service recipient and the professional service provider, and wherein authenticating the access request based on the information transfer registration record comprises matching the access request to the service recipient identifier and the professional service provider identifier.

13. The system of claim 10, wherein the registration module is further configured for:

receiving the service recipient identifier and the professional service provider identifier from the professional service provider for registering a relationship between the professional service provider and the service recipient; and requesting the authorization from the service recipient, in response registering the relationship, to transfer the data item from the financial entity to the professional service provider.

14. The system of claim 13, wherein is the registration module further configured for:

providing a web based user interface for obtaining the authorization from the service recipient via a mobile device of the service recipient, wherein requesting the authorization comprises sending an electronic communication to the service recipient, the electronic communication comprising an invitation to the service recipient to access the web based user interface for granting the authorization.

15. The system of claim 13, wherein the financial entity interface is further configured for:

providing a web based user interface for obtaining the temporary financial entity credentials and receiving the download command from the service recipient, wherein requesting the authorization comprises sending an electronic communication to the service recipient, the electronic communication comprising an invitation to the service recipient to access the web based user interface for sending the temporary financial entity credentials and the download command.

16. The system of claim 15, wherein the service provider interface is further configured for:

sending a notification to the professional service provider in response to completion of retrieving the data item, wherein the access request is received from the professional service provider in response to sending the notification.

17. The system of claim 10, wherein the registration module is further configured for storing the information transfer registration record, in response to creating thereof, in a data repository coupled to the server computer, and wherein the financial entity interface is further configured for storing the retrieved data item, in response to generation thereof, in the data repository.

18. The system of claim 10, wherein the service recipient comprises a taxpayer, wherein the professional service provider comprises a tax accountant, wherein the data item comprises a tax data item, and wherein the tax accountant prepares a tax return for the taxpayer using a tax preparation application and the tax data item in response to transmitting the retrieved data item to the professional service provider.

19. The system of claim 10, wherein the service recipient comprises an insurance policy holder, wherein the professional service provider comprises an insurance broker, wherein the data item comprises an insurance claim data item, and wherein the insurance broker prepares a claim resolution analysis report for the insurance policy holder using a claim analysis application and the insurance claim data item in response to transmitting the retrieved data item to the professional service provider.

20. A non-transitory computer readable storage medium embodying instructions executable by a computer to transfer a data item from a financial entity to a professional service provider, the instructions, when executed by the computer, comprising functionality for:

obtaining authorization from a service recipient to transfer the data item from the financial entity to the professional service provider, wherein the data item is stored in an online account held by the financial entity for the service recipient, wherein the online account exists prior to obtaining authorization from the service recipient;

creating an information transfer registration record in response to obtaining the authorization, wherein the information transfer registration record comprises a service recipient identifier identifying the service recipient and a professional service provider identifier identifying the professional service provider;

obtaining, from the service recipient, temporary financial entity credentials required to access the online account held by the financial entity for the service recipient, wherein the temporary financial entity credentials are stored in a data repository coupled to the computer;

retrieving, in response to receiving the temporary financial entity credentials from the service recipient, the data item from the financial entity using the temporary financial entity credentials;

deleting, in response to retrieving the data item, the temporary financial entity credentials in the data repository, wherein the online account exists after deleting the temporary financial entity credentials;

receiving an access request from the professional service provider to access the retrieved data item;

authenticating the access request based on the information transfer registration record; and transmitting, in response to authenticating the access request, the retrieved data item to the professional service provider.

21. The non-transitory computer readable storage medium of claim 20, wherein the instructions, when executed by the computer, further comprises functionality for:

associating the retrieved data item with the service recipient identifier, wherein the access request identifies the service recipient and the professional service provider, and wherein authenticating the access request based on the information transfer registration record comprises matching the access request to the service recipient identifier and the professional service provider identifier.

22. The non-transitory computer readable storage medium of claim 20,
wherein the instructions, when executed by the computer, further comprise functionality for:
receiving the service recipient identifier and the professional service provider identifier from the professional service provider for registering a relationship between the professional service provider and the service recipient; and
requesting the authorization from the service recipient, in response to registering the relationship, to transfer the data item from the financial entity to the professional service provider.

23. The non-transitory computer readable storage medium of claim 22,
wherein the instructions, when executed by the computer, further comprise functionality for:
providing a web based user interface for obtaining the authorization from the service recipient via a mobile device of the service recipient,
wherein requesting the authorization comprises sending an electronic communication to the service recipient, the electronic communication comprising an invitation to the service recipient to access the web based user interface for granting the authorization.

24. The non-transitory computer readable storage medium of claim 22,
wherein the instructions, when executed by the computer, further comprise functionality for:
providing a web based user interface for obtaining the temporary financial entity credentials and receiving the download command from the service recipient,
wherein requesting the authorization comprises sending an electronic communication to the service recipient, the electronic communication comprising an invitation to the service recipient to access the web based user interface for sending the temporary financial entity credentials and the download command.

25. The non-transitory computer readable storage medium of claim 24,
wherein the instructions, when executed by the computer, further comprise functionality for:
sending a notification to the professional service provider in response to retrieving the data item,
wherein the access request is received from the professional service provider in response to sending the notification.

26. The non-transitory computer readable storage medium of claim 20,
wherein the instructions, when executed by the computer, further comprise functionality for:
storing the information transfer registration record, in response to creating thereof, in a data repository coupled to the server computer; and
storing the retrieved data item, in response to generation thereof, in the data repository.

27. The non-transitory computer readable storage medium of claim 20,
wherein the service recipient is a taxpayer,
wherein the professional service provider is a tax accountant,
wherein the data item comprises a tax data item, and
wherein the tax accountant prepares a tax return for the taxpayer using a professional tax preparation application and the tax data item.

28. The non-transitory computer readable storage medium of claim 20,
wherein the service recipient is an insurance policy holder,
wherein the professional service provider is an insurance broker,
wherein the data item comprises an insurance claim data item, and
wherein the insurance broker prepares a claim resolution analysis report for the insurance policy holder using a professional claim analysis application and the insurance claim data item.

* * * * *